US012601218B2

(12) United States Patent
Liu

(10) Patent No.: US 12,601,218 B2
(45) Date of Patent: Apr. 14, 2026

(54) SHUTTER ASSEMBLY

(71) Applicant: Xuejun Liu, Xiamen (CN)

(72) Inventor: Xuejun Liu, Xiamen (CN)

(73) Assignee: Xuejun Liu, Xiamen (CN)

( * ) Notice: Subject to any disclaimer, the term of this patent is extended or adjusted under 35 U.S.C. 154(b) by 304 days.

(21) Appl. No.: 18/522,239

(22) Filed: Nov. 29, 2023

(65) Prior Publication Data

US 2024/0418033 A1 Dec. 19, 2024

(30) Foreign Application Priority Data

Jun. 16, 2023 (CN) ......................... 202321544417.5

(51) Int. Cl.
*E06B 9/02* (2006.01)

(52) U.S. Cl.
CPC ...................................... *E06B 9/02* (2013.01)

(58) Field of Classification Search
CPC ... E06B 9/02; E06B 9/36; E06B 9/386; E06B 9/38; E04B 2002/7487; E04B 2/7401
See application file for complete search history.

(56) References Cited

U.S. PATENT DOCUMENTS 5,870,867 A * 2/1999 Mitchell ............... E04B 2/7457 52/270
6,009,675 A * 1/2000 Waalkes ................ E04B 2/7433 52/36.6
6,023,893 A * 2/2000 Tanaka .................. E04B 2/7422 52/220.7
6,688,056 B2 * 2/2004 Von Hoyningen Huene ............... E04B 2/745 52/243.1
6,871,464 B2 * 3/2005 Hung ........................ E06B 9/02 52/456

(Continued)

FOREIGN PATENT DOCUMENTS

CN 202249667 U * 5/2012
CN 204609699 U * 9/2015

(Continued)

OTHER PUBLICATIONS

English translation of International Search Report for PCT/CN2023/117962 (3 pages). (Year: 2024).*

*Primary Examiner* — Rodney Mintz
(74) *Attorney, Agent, or Firm* — Bayramoglu Law Offices LLC

(57) ABSTRACT

A shutter assembly includes at least two first shutter frame strips, at least two second shutter frame strips, and at least two support beams. The first shutter frame strips are detachably provided at a first side of each of the support beams. The second shutter frame strips are detachably provided at a second side of each of the support beams. The first shutter frame strips and the second shutter frame strips are staggered in a length direction of the first support beam. In the present shutter assembly, the first shutter frame strips and the second shutter frame strips are staggered at two sides of each of the support beams. A gap region between two adjacent first shutter frame strips is exactly obstructed by the corresponding second shutter frame strip. A gap region between two adjacent second shutter frame strips is exactly obstructed by the corresponding first shutter frame strip.

9 Claims, 7 Drawing Sheets

(56) References Cited

U.S. PATENT DOCUMENTS

| | | | | |
|---|---|---|---|---|
| 8,201,609 | B1 * | 6/2012 | Kitterman | E05D 15/582 160/188 |
| 8,528,254 | B1 * | 9/2013 | Johnston | E06B 9/04 49/67 |
| 8,555,948 | B2 * | 10/2013 | Park | E06B 9/0676 160/172 R |
| 9,027,628 | B2 * | 5/2015 | Watkins | E06B 9/28 160/188 |
| 9,267,320 | B2 * | 2/2016 | Kitterman | E06B 9/0676 |
| 9,297,202 | B2 * | 3/2016 | Watkins | E06B 7/086 |
| 10,731,406 | B1 * | 8/2020 | Kitterman | E06B 7/08 |
| 11,299,887 | B2 * | 4/2022 | Pylypczak | E04B 2/825 |
| 11,686,090 | B2 * | 6/2023 | Pylypczak | E04B 2/825 52/126.4 |
| D1,058,854 | S * | 1/2025 | Liu | D6/580 |
| D1,058,855 | S * | 1/2025 | Liu | D25/48.1 |
| 2002/0121056 | A1 * | 9/2002 | Von Hoyningen Huene | E04B 2/745 52/241 |
| 2004/0200169 | A1 * | 10/2004 | Hung | E06B 9/02 52/455 |
| 2011/0214348 | A1 * | 9/2011 | Park | E06B 9/0676 49/90.1 |
| 2012/0233924 | A1 * | 9/2012 | Kitterman | E06B 9/0676 49/81.1 |
| 2014/0033610 | A1 * | 2/2014 | Watkins | E06B 7/086 49/82.1 |
| 2014/0318720 | A1 * | 10/2014 | Watkins | E06B 7/086 160/176.1 R |
| 2021/0140172 | A1 * | 5/2021 | Pylypczak | E04B 2/7401 |
| 2022/0195726 | A1 * | 6/2022 | Pylypczak | E04B 2/825 |

FOREIGN PATENT DOCUMENTS

| | | | | |
|---|---|---|---|---|
| CN | 206816146 | U | * | 12/2017 |
| CN | 211692235 | U | * | 10/2020 |
| CN | 111911054 | A | | 11/2020 |
| CN | 213016082 | U | * | 4/2021 |
| CN | 218627249 | U | * | 3/2023 |
| JP | 08165859 | A | * | 6/1996 |
| JP | 11200737 | A | * | 7/1999 |
| JP | 2003027857 | A | * | 1/2003 |
| JP | 2005226290 | A | * | 8/2005 |
| JP | 2005308976 | A | * | 11/2005 |
| JP | 2006214139 | A | * | 8/2006 |

* cited by examiner

SHUTTER ASSEMBLY

CROSS REFERENCE TO THE RELATED APPLICATIONS

This application is based upon and claims priority to Chinese Patent Application No. 202321544417.5, filed on Jun. 16, 2023, the entire contents of which are herein incorporated by reference.

TECHNICAL FIELD

The present disclosure relates to the field of building materials, and specifically to a shutter assembly.

BACKGROUND

In some living environments, there is a need to separate a connected region between two households to improve the safety and the privacy. When a solid wall is used for separation, both lighting and ventilation are affected in spite of the high privacy. With development of the building industry, the shutter as a decorative building material is also used for separation and encapsulation. The existing shutter is often provided at a single side to form a grille structure for the separation, and it is mounted and dismounted conveniently with desirable ventilation and lighting. However, due to gaps of the shutter, the privacy is poor. The grille shutter mounted at the single side is only aesthetically-pleasing at the single side. Therefore, how to implement a separation method that can realize a shading effect and a privacy protection at two sides without compromising ventilation has become a problem to be solved urgently.

SUMMARY

In view of this, an objective of the present disclosure is to provide a shutter assembly, to realize a shading effect and a privacy protection at two sides, without compromising ventilation.

To achieve the above objective, the present disclosure provides a shutter assembly. The shutter assembly includes at least two first shutter frame strips, at least two second shutter frame strips, and a first support beam, where the at least two first shutter frame strips are detachably provided at a first side of the first support beam, and the at least two second shutter frame strips are detachably provided at a second side of the first support beam; and the at least two first shutter frame strips and the at least two second shutter frame strips are staggered in a length direction of the first support beam.

Optionally, a gap region between two adjacent first shutter frame strips of the at least two first shutter frame strips is obstructed by a corresponding second shutter frame strip of the at least two second shutter frame strips; and a gap region between two adjacent second shutter frame strips of the at least two second shutter frame strips is obstructed by a corresponding first shutter frame strip of the at least two first shutter frame strips.

Optionally, the shutter assembly further includes a first fixture and a second fixture; the first support beam includes a first limit groove and a second limit groove; the first limit groove is formed in the first side and extends from a first end of the first support beam to a second end of the first support beam along the length direction of the first support beam; the second limit groove is formed in the second side and extends from the first end of the first support beam to the second end of the first support beam along the length direction of the first support beam; the first fixture is slidably provided in the first limit groove; and the second fixture is slidably provided in the second limit groove.

Optionally, the first limit groove includes a first opening and a first inner cavity; the first opening and the first inner cavity communicate with each other and extend from the first end of the first support beam to the second end of the first support beam along the length direction; a width of the first opening is less than a width of the first inner cavity; the second limit groove includes a second opening and a second inner cavity; the second opening and the second inner cavity communicate with each other and extend from the first end of the first support beam to the second end of the first support beam along the length direction; and a width of the second opening is less than a width of the second inner cavity.

Optionally, the first fixture includes a first fixture base, a first fixture connecting portion, and at least two first clips; the at least two first clips are fixed on the first fixture base through the first fixture connecting portion; the first fixture base is slidable in the first inner cavity; the first fixture connecting portion is slidable in the first opening; the at least two first clips are configured to clamp the first shutter frame strip; the first shutter frame strip includes a first shutter displaying portion and at least two first shutter mounting portions; the at least two first shutter mounting portions are respectively detachably provided in the at least two first clips; the second fixture includes a second fixture base, a second fixture connecting portion, and at least two second clips; the at least two second clips are fixed on the second fixture base through the second fixture connecting portion; the second fixture base is slidable in the second inner cavity; the second fixture connecting portion is slidable in the second opening; the at least two second clips are configured to clamp the second shutter frame strip; the second shutter frame strip includes a second shutter displaying portion and at least two second shutter mounting portions; and the at least two second shutter mounting portions are respectively detachably provided in the at least two second clips.

Optionally, the shutter assembly further includes a first side clip and a second side clip; the first side clip is configured to fixedly connect the first end of the first support beam to a first shutter carrier; the second side clip is configured to fixedly connect the second end of the first support beam to a second shutter carrier; the first side clip includes a first upper side clip arm, a first lower side clip arm, and a first connecting arm; the first upper side clip arm and the first lower side clip arm are opposite to each other, and respectively connected to two sides of the first connecting arm; the first upper side clip arm, the first lower side clip arm and the first connecting arm enclose a first clip groove; the first clip groove receives the first end of the first support beam; the first connecting arm is attached to the first side of the first support beam; the second side clip includes a second upper side clip arm, a second lower side clip arm, and a second connecting arm; the second upper side clip arm and the second lower side clip arm are opposite to each other, and respectively connected to two sides of the second connecting arm; the second upper side clip arm, the second lower side clip arm and the second connecting arm enclose a second clip groove; the second clip groove receives the second end of the first support beam; and the second connecting arm is attached to the second side of the first support beam.

Optionally, the shutter assembly further includes a limit cap; the limit cap covers upper ends of the at least two first shutter frame strips and upper ends of the at least two second shutter frame strips; the limit cap includes a first covering portion, a second covering portion, and a connecting portion; the first covering portion and the second covering portion are staggered in parallel, and connected through the connecting portion; the first covering portion covers the upper ends of the at least two first shutter frame strips; the second covering portion covers the upper ends of the at least two second shutter frame strips; the first support beam further includes a third side and a fourth side; the third side and the fourth side are opposite to each other, and the first side, the third side, the second side and the fourth side are sequentially connected to enclose an overall outer side of the first support beam; and the connecting portion of the limit cap covers the third side of the first support beam, and a plurality of through holes are formed in the connecting portion.

Optionally, the shutter assembly further includes a second support beam; the second support beam is parallel to the first support beam; the second support beam is located below the first support beam; the second support beam also includes a first side and a second side opposite to each other; the at least two first shutter frame strips are detachably provided at the first side of the second support beam; and the at least two second shutter frame strips are detachably provided at the second side of the second support beam.

Optionally, the second support beam further includes a third side and a fourth side opposite to each other, and the first side, the third side, the second side and the fourth side of the second support beam are sequentially connected to enclose an overall outer side of the second support beam; the shutter assembly further includes a first buckle bottom support and a second buckle bottom support; the second support beam includes a first limit groove and a second limit groove; the first limit groove of the second support beam is formed in the first side of the second support beam and extends from a first end of the second support beam to a second end of the second support beam along a length direction of the second support beam; the second limit groove of the second support beam is formed in the second side of the second support beam and extends from the first end of the second support beam to the second end of the second support beam along the length direction of the second support beam; the first buckle bottom support is slidably provided in the first limit groove of the second support beam; and the second buckle bottom support is slidably provided in the second limit groove of the second support beam.

Optionally, the first limit groove of the second support beam includes a first opening and a first inner cavity; the first opening and the first inner cavity of the second support beam communicate with each other and extend from the first end of the second support beam to the second end of the second support beam along the length direction of the second support beam; a width of the first opening of the second support beam is less than a width of the first inner cavity of the second support beam; the second limit groove of the second support beam includes a second opening and a second inner cavity; the second opening and the second inner cavity of the second support beam communicate with each other and extend from the first end of the second support beam to the second end of the second support beam along the length direction; a width of the second opening of the second support beam is less than a width of the second inner cavity of the second support beam; the first buckle bottom support includes a first buckle base, a first buckle connecting portion, at least two first buckle clips, and a first bottom support member; the at least two first buckle clips are fixed on the first buckle base through the first buckle connecting portion; the first bottom support member is fixedly connected to the first buckle connecting portion and the at least two first buckle clips; the first buckle base is slidable in the first inner cavity of the second support beam; the first buckle connecting portion is slidable in the first opening of the second support beam; the at least two first buckle clips are configured to clamp the first shutter frame strip; the at least two first shutter mounting portions are respectively detachably provided in the at least two first buckle clips; the first bottom support member is sleeved on lower ends of the at least two first shutter frame strips; the second buckle bottom support includes a second buckle base, a second buckle connecting portion, at least two second buckle clips, and a second bottom support member; the at least two second buckle clips are fixed on the second buckle base through the second buckle connecting portion; the second bottom support member is fixedly connected to the second buckle connecting portion and the at least two second buckle clips; the second buckle base is slidable in the second inner cavity of the second support beam; the second buckle connecting portion is slidable in the second opening of the second support beam; the at least two second buckle clips are configured to clamp the second shutter frame strip; the at least two second shutter mounting portions are respectively detachably provided in the at least two second buckle clips; and the second bottom support member is sleeved on lower ends of the at least two second shutter frame strips.

Since the first shutter frame strips are detachably provided at the first side of the first support beam, and the second shutter frame strips are detachably provided at the second side of the first support beam, so the shutter assembly provided by the present disclosure is mounted and dismounted conveniently. The first shutter frame strips and the second shutter frame strips are staggered at two sides of the first support beam. A gap region between two adjacent first shutter frame strips is exactly obstructed by the corresponding second shutter frame strip. A gap region between two adjacent second shutter frame strips is exactly obstructed by the corresponding first shutter frame strip. Therefore, the present disclosure makes the shutter frame strips at two sides realize a shading effect and a privacy protection, without compromising ventilation.

BRIEF DESCRIPTION OF THE DRAWINGS

In order to describe the technical solutions of the embodiments of the present disclosure more clearly, the drawings of the embodiments will be briefly introduced below. Obviously, the accompanying drawings described below are only some embodiments of the present disclosure, rather than limits to the present disclosure.

DETAILED DESCRIPTION OF THE EMBODIMENTS

In order to make the objectives, technical solutions, and advantages of the embodiments of the present disclosure clearer, the technical solutions in the embodiments of the present disclosure are clearly and completely described below with reference to the drawings in the embodiments of the present disclosure. Apparently, the described embodiments are merely a part, rather than all of the embodiments of the present disclosure. Based on the described embodiments of the present disclosure, all other embodiments obtained by those of ordinary skill in the art without creative work shall fall within the protection scope of the present disclosure.

Figure 1:
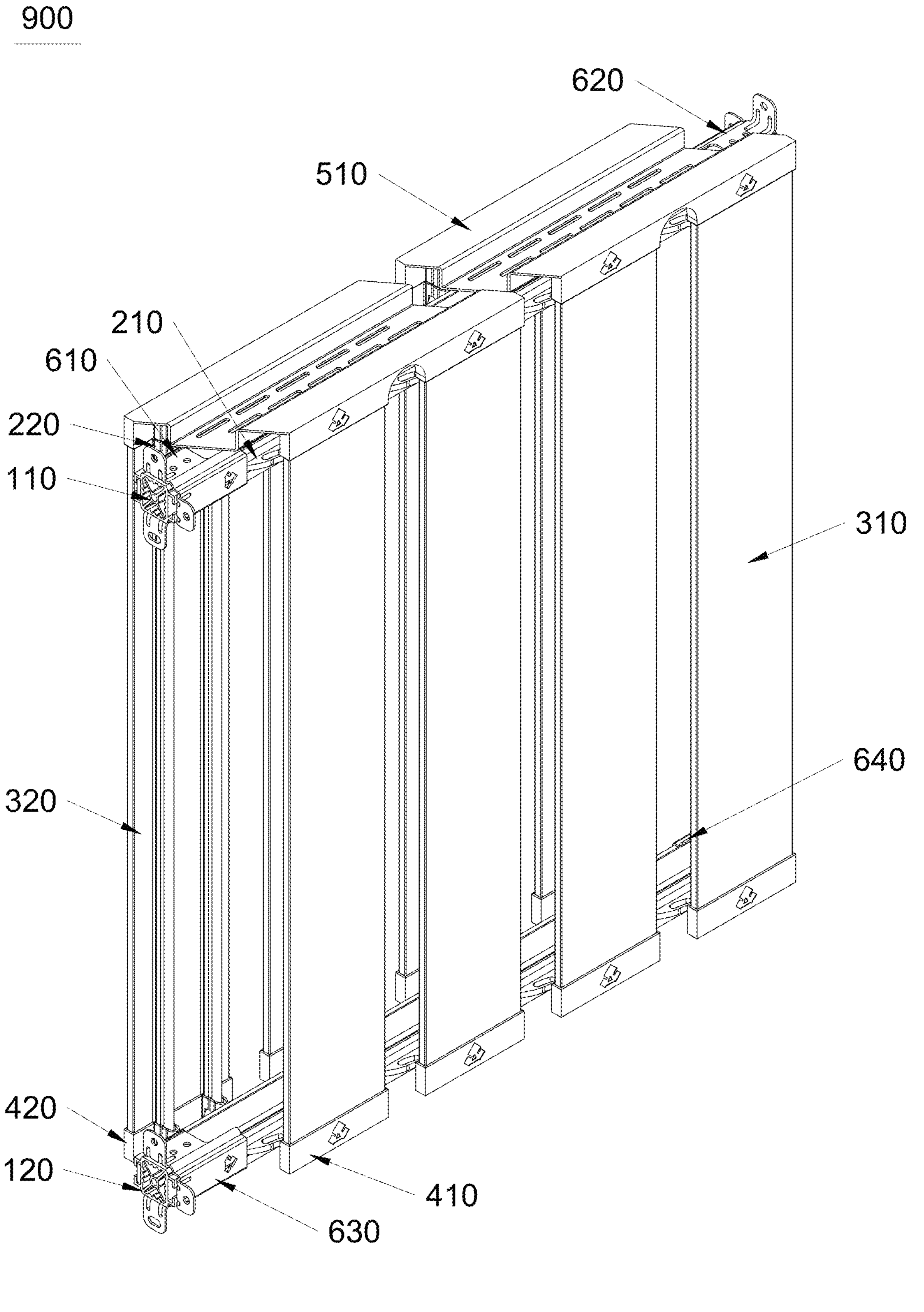
FIG. 1 is a schematic structural view of a shutter assembly according to an embodiment of the present disclosure.
Figure 2:
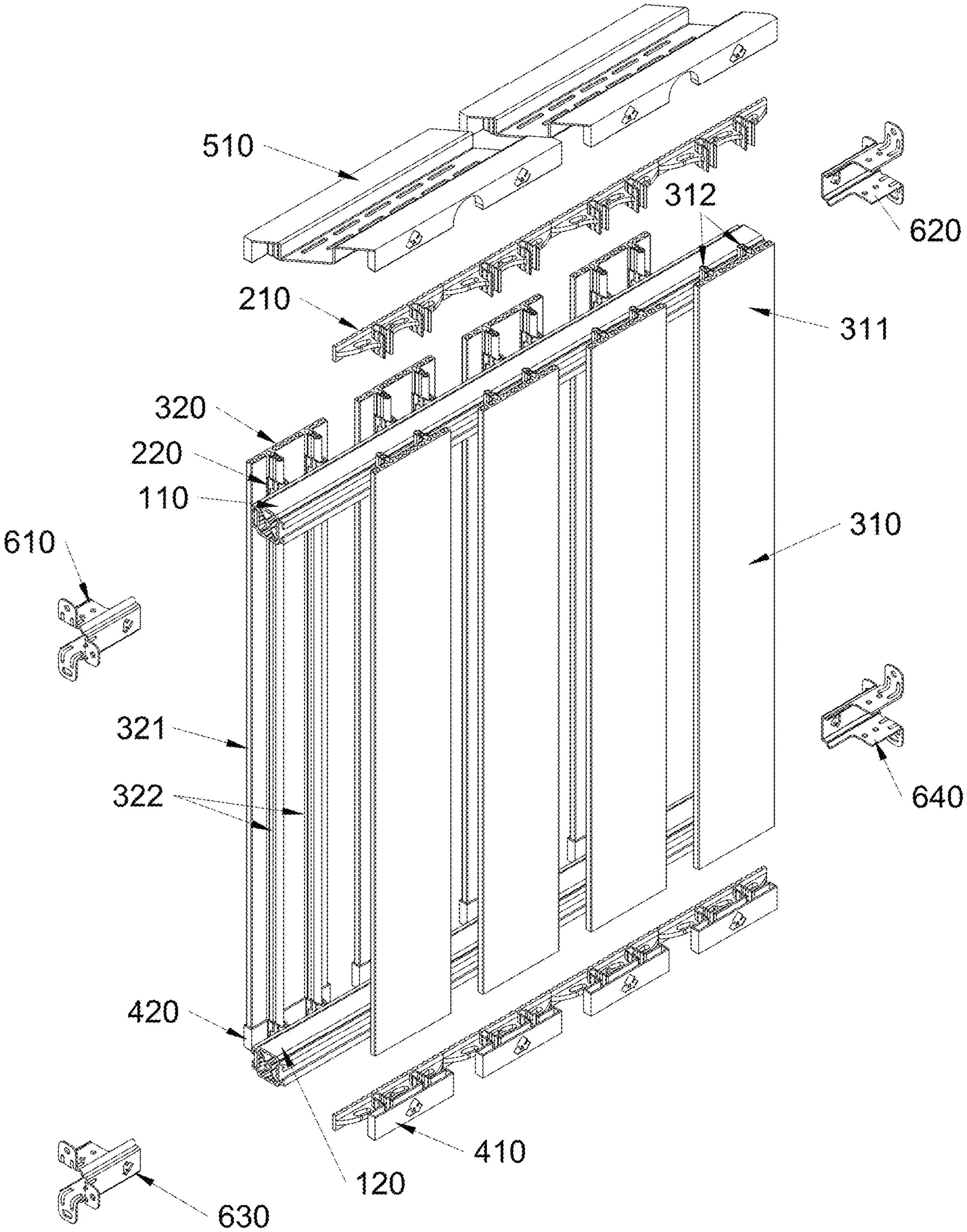
FIG. 2 is a partial exploded view of the shutter assembly in FIG. 1.
Figure 4:
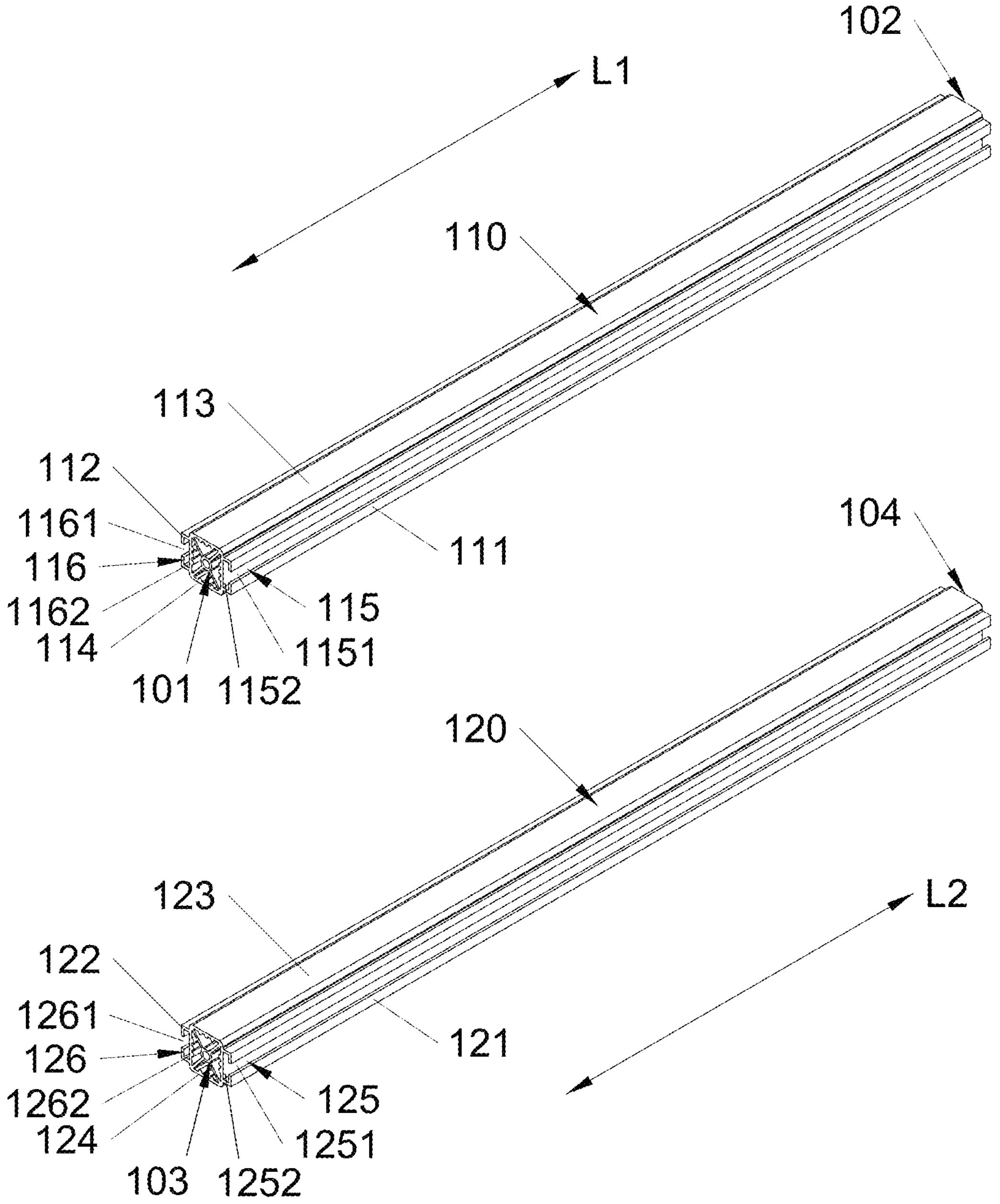
FIG. 4 is a schematic structural view of a first support beam and a second support beam in the shutter assembly in FIG. 1.

FIG. 1 and FIG. 2 show shutter assembly 900 according to an embodiment of the present disclosure. The shutter assembly 900 includes first support beam 110, second support beam 120, first fixture 210, second fixture 220, first shutter frame strips 310, second shutter frame strips 320, first buckle bottom support 410, second buckle bottom support 420, limit cap 510, first side clip 610, second side clip 620, third side clip 630, and fourth side clip 640. The second support beam 120 is parallel to the first support beam 110. The second support beam 120 is located below the first support beam 110. Referring to FIG. 4, the first fixture 210 is slidably provided at first side 111 of the first support beam 110, and the second fixture 220 is slidably provided at second side 112 of the first support beam 110. The first side 111 of the first support beam 110 and the second side 112 of the first support beam 110 are opposite to each other. The first buckle bottom support 410 is slidably provided at first side 121 of the second support beam 120, and the second buckle bottom support 420 is slidably provided at second side 122 of the second support beam 120. The first side 121 of the second support beam 120 and the second side 122 of the second support beam 120 are opposite to each other.

Figure 3:
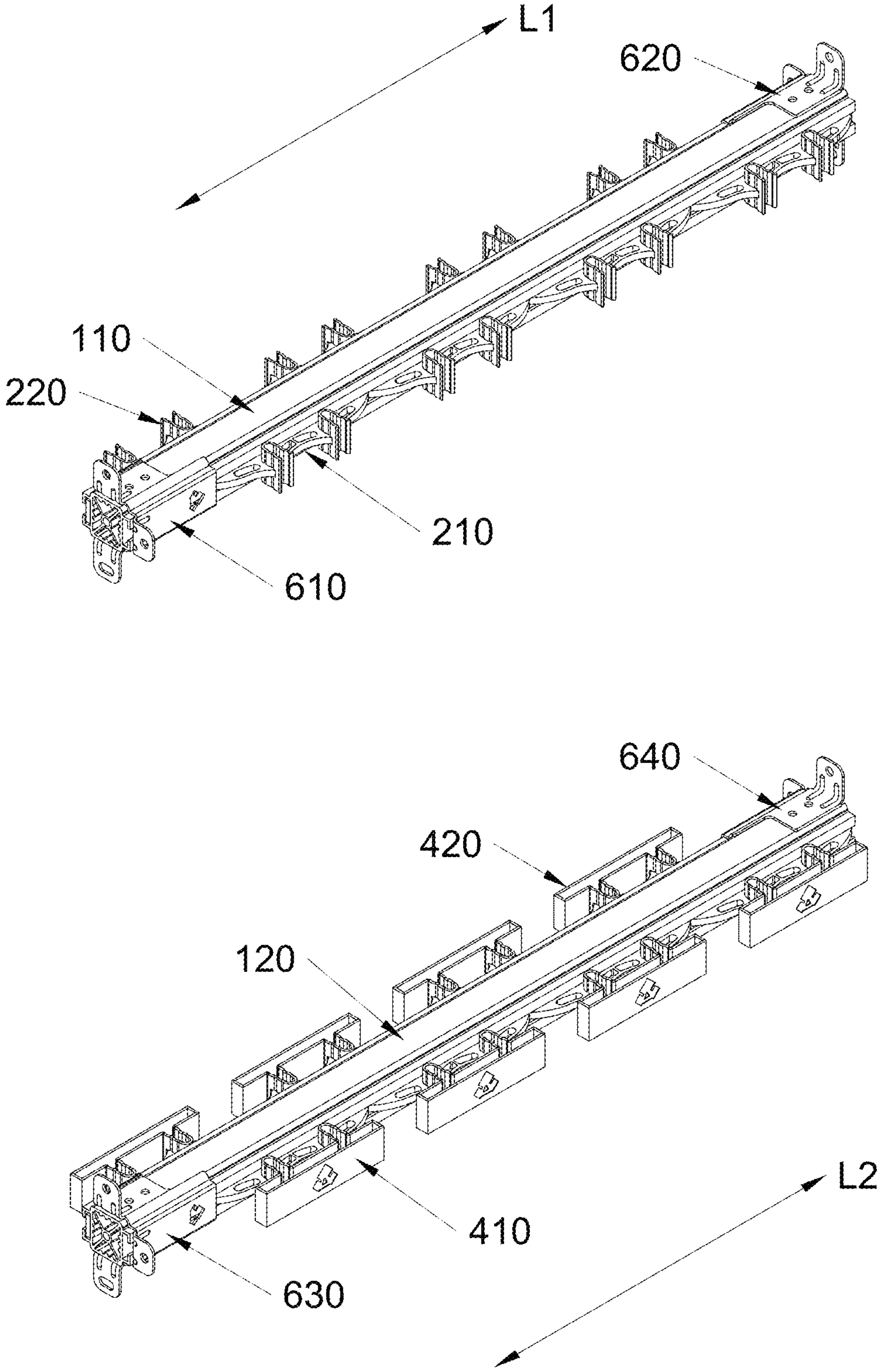
FIG. 3 is a partial structural view of the shutter assembly in FIG. 1.

Referring to FIGS. 1-3, the first shutter frame strips 310 are perpendicular to the first support beam 110 and the second support beam 120, and the first shutter frame strips 310 are detachably provided in the first fixture 210 and the first buckle bottom support 410. The second shutter frame strips 320 are perpendicular to the first support beam 110 and the second support beam 120, and the second shutter frame strips 320 are detachably provided in the second fixture 220 and the second buckle bottom support 420. The first shutter frame strips 310 and the second shutter frame strips 320 are staggered in length direction L1 of the first support beam 110. A gap region between two adjacent first shutter frame strips 310 is exactly obstructed by the corresponding second shutter frame strip 320. A gap region between two adjacent second shutter frame strips 320 is exactly obstructed by the corresponding first shutter frame strip 310. Therefore, the present disclosure makes the shutter frame strips at two sides realize a shading effect and a privacy protection, without compromising ventilation. The limit cap 510 covers upper ends of the first shutter frame strips 310 and upper ends of the second shutter frame strips 320, limits positions between the first shutter frame strips 310 and the first support beam 110 as well as between the second shutter frame strips 320 and the first support beam, and obstructs gaps between the first support beam 110 and the first shutter frame strips 310 as well as between the first support beam and the second shutter frame strips 320. This achieves better dustproof and waterproof effects. In the embodiment, there are four first shutter frame strips 310 and four second shutter frame strips 320. In other embodiments, there may also be two, three or more first shutter frame strips 310 and two, three or more second shutter frame strips 320. A specific number of the first shutter frame strips and a specific number of the second shutter frame strips can be increased or decreased according to a size of a mounting site.

Referring to FIG. 3 and FIG. 4, the first side clip 610 and the second side clip 620 are respectively provided at two ends of the first support beam 110. The first side clip 610 is configured to fixedly connect first end 101 of the first support beam 110 to a first shutter carrier (not shown in the figure). In actual use, the first shutter carrier may be a wall, a shutter post, a cabinet, a square tube, etc. The second side clip 620 is configured to fixedly connect second end 102 of the first support beam 110 to a second shutter carrier (not shown in the figure). In actual use, the second shutter carrier may be a wall, a shutter post, a cabinet, a square tube, etc. The third side clip 630 and the fourth side clip 640 are respectively provided at two ends of the second support beam 120. The third side clip 630 is configured to fixedly connect first end 103 of the second support beam 120 to the first shutter carrier (not shown in the figure). In actual use, the first shutter carrier may be the wall, the shutter post, the cabinet, the square tube, etc. The fourth side clip 640 is configured to fixedly connect second end 104 of the second support beam 120 to the second shutter carrier (not shown in the figure). In actual use, the second shutter carrier may be the wall, the shutter post, the cabinet, the square tube, etc. With the four side clips, the first support beam 110 and the second support beam 120 are respectively connected to the first shutter carrier and the second shutter carrier in a screw locking manner and the like.

Referring to FIG. 3 and FIG. 4, the first support beam 110 further includes third side 113, fourth side 114, first limit groove 115, and second limit groove 116. The third side 113 of the first support beam 110 and the fourth side 114 of the first support beam 110 are opposite to each other. The first side 111, the second side 112, the third side 113 and the fourth side 114 of the first support beam 110 are connected sequentially to enclose an overall outer side of the first support beam 110. The first limit groove 115 of the first support beam 110 is formed in the first side 111 of the first support beam 110 and extends from the first end 101 of the first support beam 110 to the second end 102 of the first support beam along the length direction L1 of the first support beam 110. The first fixture 210 is slidably provided in the first limit groove 115 of the first support beam 110. The second limit groove 116 of the first support beam 110 is formed in the second side 112 of the first support beam 110 and extends from the first end 101 of the first support beam 110 to the second end 102 of the first support beam along the length direction L1 of the first support beam 110. The second fixture 220 is slidably provided in the second limit groove 116 of the first support beam 110.

Referring to FIG. 4, the first limit groove 115 of the first support beam 110 includes first opening 1151 and first inner cavity 1152. The first opening 1151 and the first inner cavity 1152 of the first support beam 110 communicate with each other and extend from the first end 101 of the first support beam 110 to the second end 102 of the first support beam along the length direction L1 of the first support beam 110. A width of the first opening 1151 of the first support beam 110 is less than a width of the first inner cavity 1152 of the first support beam. The second limit groove 116 of the first support beam 110 includes second opening 1161 and second inner cavity 1162. The second opening 1161 and the second inner cavity 1162 of the first support beam 110 communicate with each other and extend from the first end 101 of the first support beam 110 to the second end 102 of the first support beam along the length direction L1 of the first support beam 110. A width of the second opening 1161 of the first support beam 110 is less than a width of the second inner cavity 1162 of the first support beam.

Referring to FIG. 3 and FIG. 4, the second support beam 120 further includes third side 123, fourth side 124, first limit groove 125, and second limit groove 126. The third side 123 of the second support beam 120 and the fourth side 124 of the second support beam 120 are opposite to each other. The first side 121, the second side 122, the third side 123 and the fourth side 124 of the second support beam 120 are connected sequentially to enclose an overall outer side of the second support beam 120. The first limit groove 125 of the second support beam 120 is formed in the first side 121 of the second support beam 120 and extends from the first end 103 of the second support beam 120 to the second end 104 of the second support beam along length direction L2 of the second support beam 120. The first buckle bottom support 410 is slidably provided in the first limit groove 125 of the second support beam 120. The second limit groove 126 of the second support beam 120 is formed in the second side 122 of the second support beam 120 and extends from the first end 103 of the second support beam 120 to the second end 104 of the second support beam along the length direction L2 of the second support beam 120. The second buckle bottom support 420 is slidably provided in the second limit groove 126 of the second support beam 120.

Referring to FIG. 4, the first limit groove 125 of the second support beam 120 includes first opening 1251 and first inner cavity 1252. The first opening 1251 and the first inner cavity 1252 of the second support beam 120 communicate with each other and extend from the first end 103 of the second support beam 120 to the second end 104 of the second support beam along the length direction L2 of the second support beam 120. A width of the first opening 1251 of the second support beam 120 is less than a width of the first inner cavity 1252 of the second support beam. The second limit groove 126 of the second support beam 120 includes second opening 1261 and second inner cavity 1262. The second opening 1261 and the second inner cavity 1262 of the second support beam 120 communicate with each other and extend from the first end 103 of the second support beam 120 to the second end 104 of the second support beam along the length direction L2 of the second support beam 120. A width of the second opening 1261 of the second support beam 120 is less than a width of the second inner cavity 1262 of the second support beam.

Figure 5:
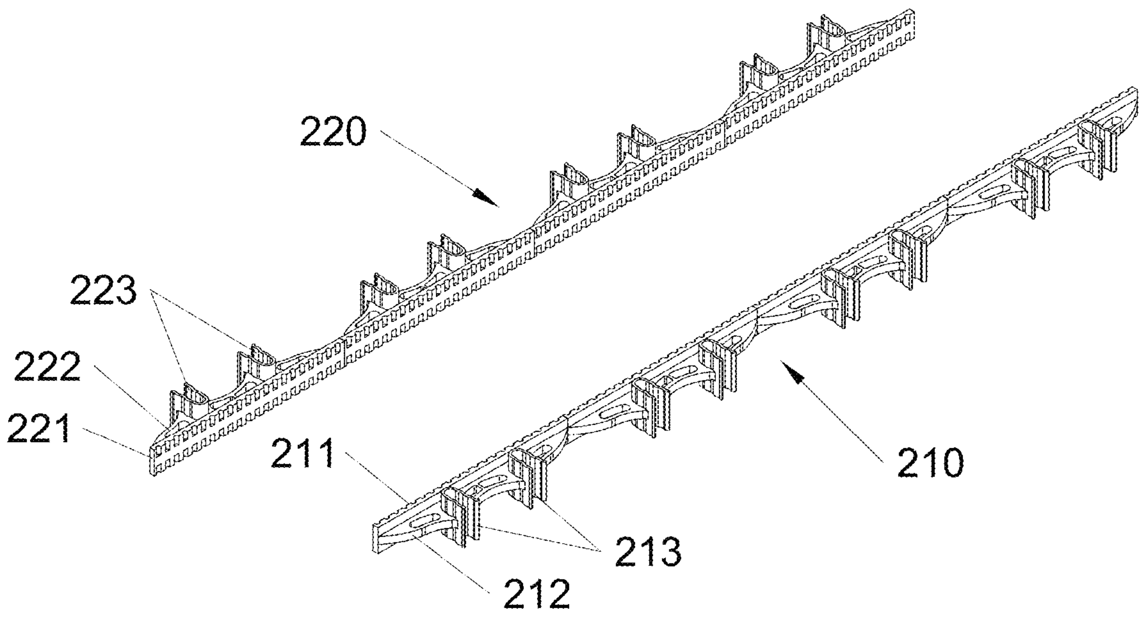
FIG. 5 is a schematic structural view of a first fixture and a second fixture in the shutter assembly in FIG. 1.

Referring to FIG. 4 and FIG. 5, the first fixture 210 includes first fixture base 211, first fixture connecting portion 212, and first clips 213. The first clips 213 are fixed on the first fixture base 211 through the first fixture connecting portion 212. The first fixture base 211 is slidable in the first inner cavity 1152 of the first support beam 110. The first fixture connecting portion 212 is slidable in the first opening 1151 of the first support beam 110. Since the width of the first opening 1151 of the first support beam 110 is less than the width of the first inner cavity 1152 of the first support beam, the first fixture base 211 cannot fall from the first opening 1151 of the first support beam 110. Referring to FIG. 1, the first clips 213 are configured to clamp the first shutter frame strip 310. The first fixture connecting portion 212 is narrower than the first opening 1151 of the first support beam 110, and a first expansion coefficient is generated by a gap between the first fixture connecting portion and the first opening of the first support beam. The first clips 213 do not lock the first shutter frame strip 310 deadly. The first shutter frame strip 310 can move in the first clips 213. A second expansion coefficient is generated between the first clips 213 and the first shutter frame strip 310. Under a combined action of the first expansion coefficient and the second expansion coefficient, a certain telescopic space is generated. In the embodiment, there are eight first clips 213. In other embodiments, there may also be two, three or more first clips 213. Specifically, a number of the first clips may be increased or decreased according to a structure and a number of the first shutter frame strips 310.

Referring to FIG. 4 and FIG. 5, the second fixture 220 includes second fixture base 221, second fixture connecting portion 222, and second clips 223. The second clips 223 are fixed on the second fixture base 221 through the second fixture connecting portion 222. The second fixture base 221 is slidable in the second inner cavity 1162 of the first support beam 110. The second fixture connecting portion 222 is slidable in the second opening 1161 of the first support beam 110. Since the width of the second opening 1161 of the first support beam 110 is less than the width of the second inner cavity 1162 of the first support beam, the second fixture base 221 cannot fall from the second opening 1161 of the first support beam 110. Referring to FIG. 1, the second clips 223 are configured to clamp the second shutter frame strip 320. The second fixture connecting portion 222 is narrower than the second opening 1161 of the first support beam 110, and a first expansion coefficient is generated by a gap between the second fixture connecting portion and the second opening of the first support beam. The second clips 223 do not lock the second shutter frame strip 320 deadly. The second shutter frame strip 320 can move in the second clips 223. A second expansion coefficient is generated between the second clips 223 and the second shutter frame strip 320. Under a combined action of the first expansion coefficient and the second expansion coefficient, a certain telescopic space is generated. In the embodiment, there are eight second clips 223. In other embodiments, there may also be two, three or more second clips 223. Specifically, a number of the second clips may be increased or decreased according to a structure and a number of the second shutter frame strips 320.

Referring to FIG. 2 and FIG. 5, the first shutter frame strip 310 includes first shutter displaying portion 311 and first shutter mounting portions 312. In actual use, the first shutter mounting portions 312 are respectively detachably provided in the first clips 213. The first shutter displaying portion 311 faces a user. Therefore, the shutter assembly is mounted and dismounted conveniently, and is aesthetically-pleasing. In the embodiment, there are two first shutter mounting portions 312. Accordingly, the two first shutter mounting portions 312 are respectively detachably provided in two first clips 213, so as to realize stable connection. In other embodiments, there may also be three, four or more first shutter mounting portions 312. Accordingly, the number of the first clips 213 is increased or decreased.

Referring to FIG. 2 and FIG. 5, the second shutter frame strip 320 includes second shutter displaying portion 321 and second shutter mounting portions 322. In actual use, the second shutter mounting portions 322 are respectively detachably provided in the second clips 223. The second shutter displaying portion 321 faces the user. Therefore, the shutter assembly is mounted and dismounted conveniently, and is aesthetically-pleasing. In the embodiment, there are two second shutter mounting portions 322. Accordingly, the two second shutter mounting portions 322 are respectively detachably provided in two second clips 223, so as to realize stable connection. In other embodiments, there may also be three, four or more second shutter mounting portions 322. Accordingly, the number of the second clips 223 is increased or decreased.

Figure 6:
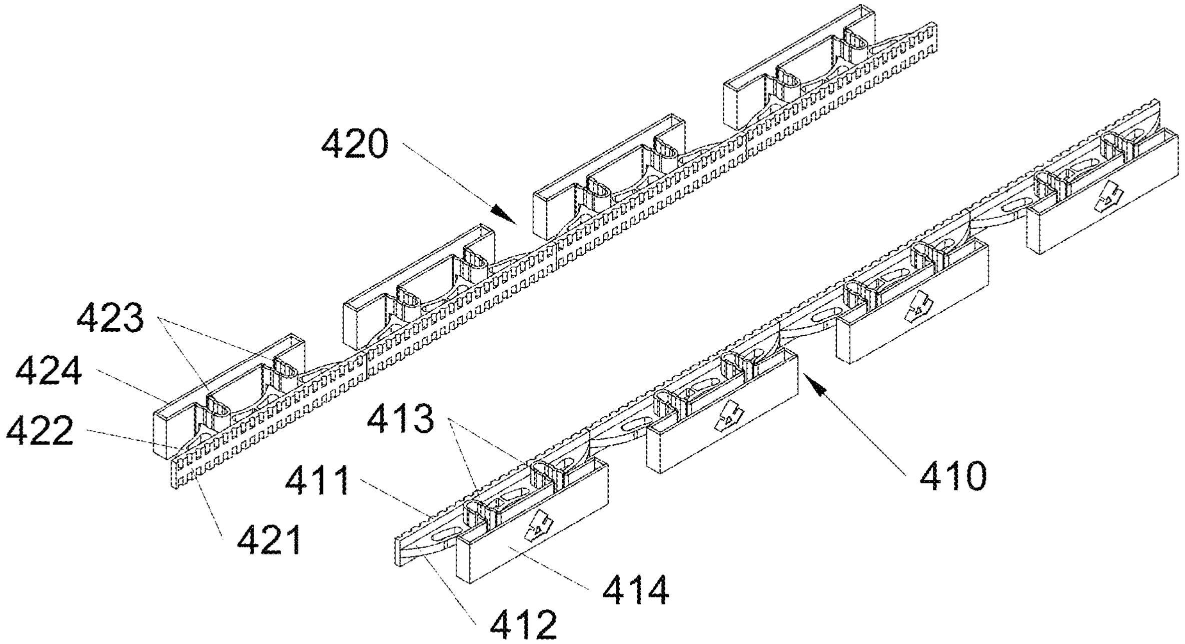
FIG. 6 is a schematic structural view of a first buckle bottom support and a second buckle bottom support in the shutter assembly in FIG. 1.
Figure 7:
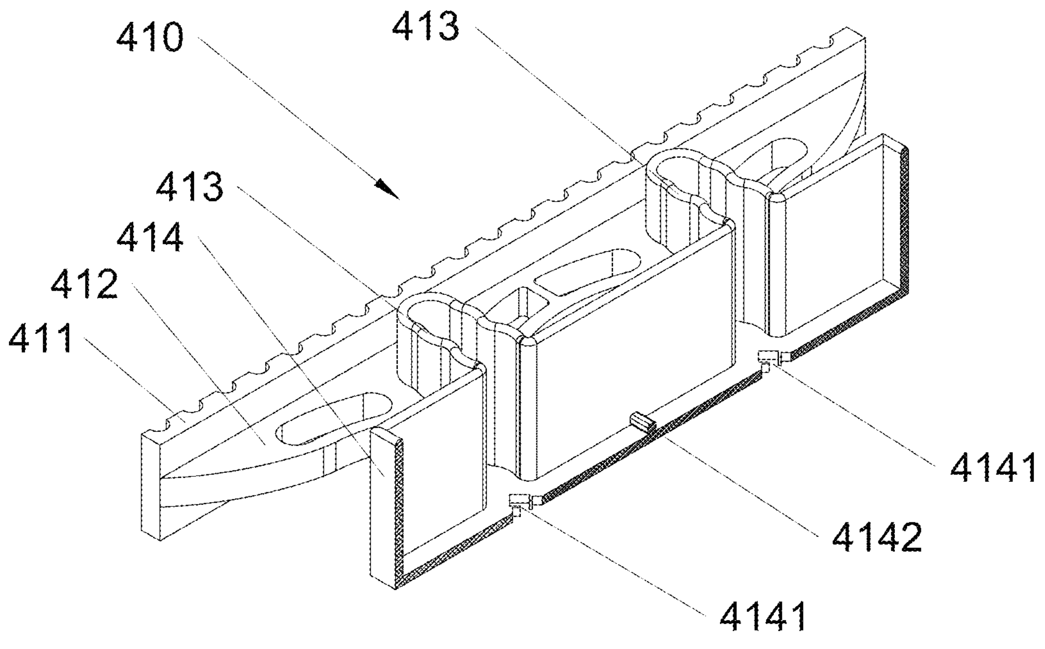
FIG. 7 is a partial sectional view of the first buckle bottom support in FIG. 6.
Figure 8:
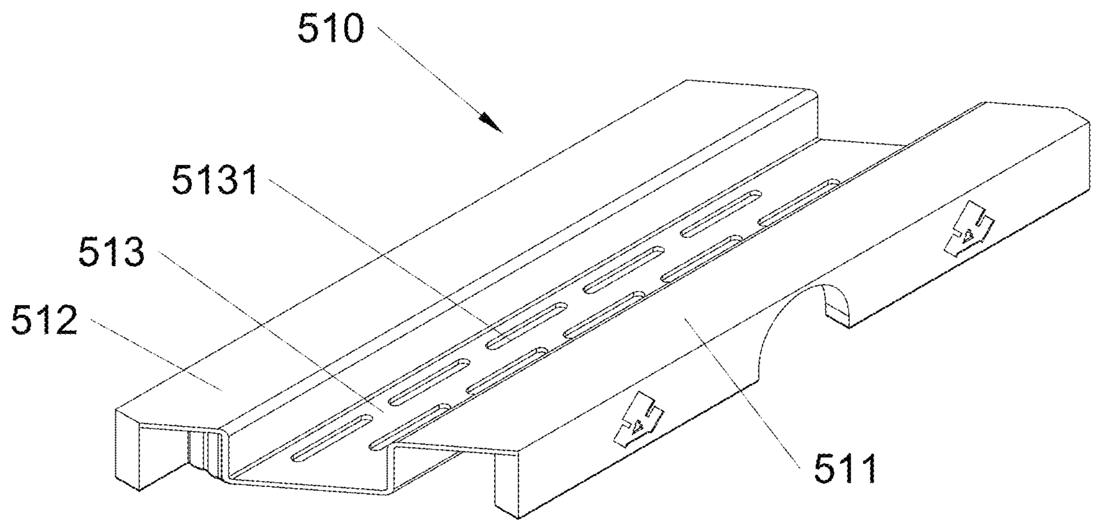
FIG. 8 is a schematic structural view of a limit cap in the shutter assembly in FIG. 1.
Figure 9:
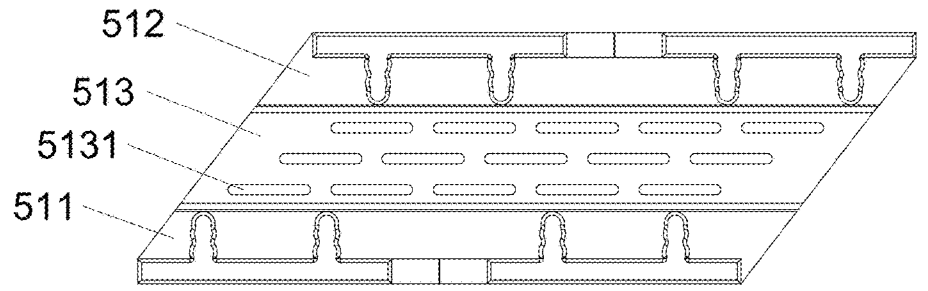
FIG. 9 is a schematic structural view of the limit cap in FIG. 8 from another perspective.

Referring to FIG. 4 and FIG. 6, the first buckle bottom support 410 includes first buckle base 411, first buckle connecting portion 412, first buckle clips 413, and first bottom support member 414. The first buckle clips 413 are fixed on the first buckle base 411 through the first buckle connecting portion 412. The first bottom support member 414 is fixedly connected to the first buckle connecting portion 412 and the first buckle clips 413. The first buckle base 411 is slidable in the first inner cavity 1252 of the second support beam 120. The first buckle connecting portion 412 is slidable in the first opening 1251 of the second support beam 120. Since the width of the first opening 1251 of the second support beam 120 is less than the width of the first inner cavity 1252 of the second support beam, the first buckle base 411 cannot fall from the first opening 1251 of the second support beam 120. Referring to FIG. 1, the first buckle clips 413 are configured to clamp the first shutter frame strip 310. The first buckle connecting portion 412 is narrower than the first opening 1251 of the second support beam 120, and a first expansion coefficient is generated by a gap between the first buckle connecting portion and the first opening of the second support beam. The first clips 413 do not lock the first shutter frame strip 310 deadly. The first shutter frame strip 310 can move in the first clips 413. A second expansion coefficient is generated between the first buckle clips 413 and the first shutter frame strip 310. Under a combined action of the first expansion coefficient and the second expansion coefficient, a certain telescopic space is generated. The first bottom support member 414 is sleeved on a lower end of the first shutter frame strip 310, so as to limit a position between the first shutter frame strip 310 and the second support beam 120, and obstruct a gap of the lower end of the first shutter frame strip 310, thereby achieving dustproof and waterproof effects. The first bottom support member 414 is fixedly connected to the first buckle clips 413, the first buckle connecting portion 412 and the first buckle base 411. This achieves an anti-theft effect, and can prevent people from directly detaching the first bottom support member 414 to damage the shutter assembly 900. Referring to FIG. 7, the first bottom support member 414 includes two drainage through holes 4141 and one drainage protrusion 4142. The drainage protrusion 4142 is provided between the two drainage through holes 4141, and configured to shunt accumulated water in the first bottom support member 414 to the two drainage through holes 4141. The accumulated water is drained from the two drainage through holes 4141. This prevents water accumulation in the shutter assembly 900 to affect a service life of the shutter assembly 900. In the embodiment, there are eight first buckle clips 413. In other embodiments, there may also be two, three or more first buckle clips 413. Specifically, a number of the first buckle clips may be increased or decreased according to a number of the first shutter frame strips 310. The two first shutter mounting portions 312 are respectively detachably provided in two first buckle clips 413, so as to realize stable connection.

Referring to FIG. 4 and FIG. 6, the second buckle bottom support 420 includes second buckle base 421, second buckle connecting portion 422, second buckle clips 423, and second bottom support member 424. The second buckle clips 423 are fixed on the second buckle base 421 through the second buckle connecting portion 422. The second bottom support member 424 is fixedly connected to the second buckle connecting portion 422 and the second buckle clips 423. The second buckle base 421 is slidable in the second inner cavity 1262 of the second support beam 120. The first buckle connecting portion 422 is slidable in the second opening 1261 of the second support beam 120. Since the width of the second opening 1261 of the second support beam 120 is less than the width of the second inner cavity 1262 of the second support beam, the second buckle base 421 cannot fall from the second opening 1261 of the second support beam 120. Referring to FIG. 1, the second buckle clips 423 are configured to clamp the second shutter frame strip 320. The second buckle connecting portion 422 is narrower than the second opening 1261 of the second support beam 120, and a first expansion coefficient is generated by a gap between the second buckle connecting portion and the second opening of the second support beam. The second buckle clips 423 do not lock the second shutter frame strip 320 deadly. The second shutter frame strip 320 can move in the second buckle clips 423. A second expansion coefficient is generated between the second buckle clips 423 and the second shutter frame strip 320. Under a combined action of the first expansion coefficient and the second expansion coefficient, a certain telescopic space is generated. The second bottom support member 424 is sleeved on a lower end of the second shutter frame strip 320, so as to limit a position between the second shutter frame strip 320 and the second support beam 120, and obstruct a gap of the lower end of the second shutter frame strip 320, thereby achieving dustproof and waterproof effects. The second bottom support member 424 is fixedly connected to the second buckle clips 423, the second buckle connecting portion 422 and the second buckle base 421. This achieves an anti-theft effect, and can prevent people from directly detaching the second bottom support member 424 to damage the shutter assembly 900. The second bottom support member 424 is structurally the same as the first bottom support member 414, and also includes two second drainage through holes and one drainage protrusion. This is not described herein. In the embodiment, there are eight second buckle clips 423. In other embodiments, there may also be two, three or more second buckle clips 423. Specifically, a number of the second buckle clips may be increased or decreased according to a number of the second shutter frame strips 320. The two second shutter mounting portions 322 are respectively detachably provided in two second buckle clips 423, so as to realize stable connection.

Referring to FIG. 1, FIG. 4, FIG. 8 and FIG. 9, the limit cap 510 includes first covering portion 511, second covering portion 512, and connecting portion 513. The first covering portion 511 and the second covering portion 512 are staggered in parallel, and connected through the connecting portion 513. The first covering portion 511 covers an upper end of the first shutter frame strip 310, so as to limit a position between the first shutter frame strip 310 and the first support beam 110, and obstruct a gap between the upper end of the first shutter frame strip 310 and the first support beam 110, thereby achieving better dustproof and waterproof effects. The second covering portion 512 covers an upper end of the second shutter frame strip 320, so as to limit a position between the second shutter frame strip 320 and the first support beam 110, and obstruct a gap between the upper end of the second shutter frame strip 320 and the first support beam 110, thereby achieving better dustproof and waterproof effects. The connecting portion 513 of the limit cap 510 covers the third side 113 of the first support beam 110. A plurality of through holes 5131 are formed in the connecting portion 513 of the limit cap 510, so as to achieve ventilation and drainage effects. A length of the limit cap 510 can be determined according to a number of the first shutter frame strips 310, a number of the second shutter frame strips 320 and a size of the mounting site.

Figure 10A:
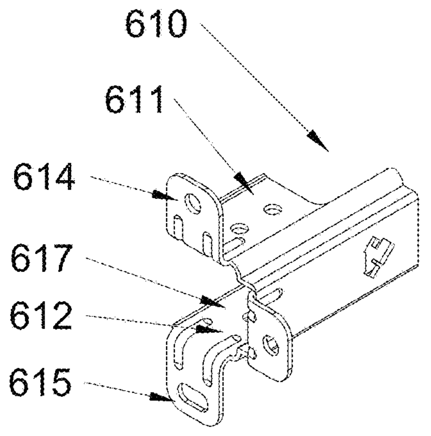
FIGS. 10A-10D are schematic structural views of a first side clip, a second side clip, a third side clip and a fourth side clip in the shutter assembly in FIG. 1.

Referring to FIG. 1, FIG. 4 and FIG. 10A, the first side clip 610 includes first upper side clip arm 611, first lower side clip arm 612, first connecting arm 613, first upper side clip support arm 614, first lower side clip support arm 615, and first connecting support arm 616. The first upper side clip arm 611 and the first lower side clip arm 612 are opposite to each other, and respectively connected to two sides of the first connecting arm 613. The first upper side clip arm 611, the first lower side clip arm 612 and the first connecting arm 613 enclose first clip groove 617. The first clip groove 617 receives the first end 101 of the first support beam 110. The first upper side clip support arm 614 is formed by extending the first upper side clip arm 611 outward and bending the first upper side clip arm. The first lower side clip support arm 615 is formed by extending the first lower side clip arm 612 outward and bending the first lower side clip arm. The first connecting support arm 616 is formed by extending the first connecting arm 613 outward and bending the first connecting arm. The first end 101 of the first support beam 110 is connected to the first shutter carrier (not shown in the figure) through the first upper side clip support arm 614, the first lower side clip support arm 615 and the first connecting support arm 616. In actual use, the first shutter carrier may be the wall, the shutter post, the cabinet, the square tube, etc. The first connecting arm 613 is attached to the first side 111 of the first support beam 110, so as to abut against the first fixture 210 at the first end 101 of the first support beam 110, limit relative positions of the first fixture 210 and the first support beam 110, and make mounting positions of the first fixture 210 and the second fixture 220 staggered to each other on the first support beam 110. Consequently, the first shutter frame strips 310 and the second shutter frame strips 320 are staggered to each other. This makes the shutter frame strips at two sides realize the shading effect and a privacy protection, without compromising the ventilation.

Figure 10B:
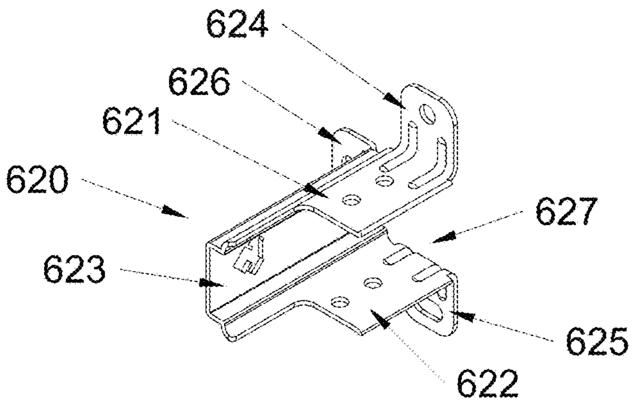

Referring to FIG. 1, FIG. 4 and FIG. 10B, the second side clip 620 includes second upper side clip arm 621, second lower side clip arm 622, second connecting arm 623, second upper side clip support arm 624, second lower side clip support arm 625, and second connecting support arm 626. The second upper side clip arm 621 and the second lower side clip arm 622 are opposite to each other, and respectively connected to two sides of the second connecting arm 623. The second upper side clip arm 621, the second lower side clip arm 622 and the second connecting arm 623 enclose second clip groove 627. The second clip groove 627 receives the second end 102 of the first support beam 110. The second upper side clip support arm 624 is formed by extending the second upper side clip arm 621 outward and bending the second upper side clip arm. The second lower side clip support arm 625 is formed by extending the second lower side clip arm 622 outward and bending the second lower side clip arm. The second connecting support arm 626 is formed by extending the second connecting arm 623 outward and bending the second connecting arm. The second end 102 of the first support beam 110 is connected to the second shutter carrier (not shown in the figure) through the second upper side clip support arm 624, the second lower side clip support arm 625 and the second connecting support arm 626. In actual use, the second shutter carrier may be the wall, the shutter post, the cabinet, the square tube, etc. The second connecting arm 623 is attached to the second side 112 of the first support beam 110, so as to abut against the second fixture 220 at the second end 102 of the first support beam 110, limit relative positions of the second fixture 220 and the first support beam 110, and make mounting positions of the second fixture 220 and the first fixture 210 staggered to each other on the first support beam 110. Consequently, the first shutter frame strips 310 and the second shutter frame strips 320 are staggered to each other. This makes the shutter frame strips at two sides realize the shading effect and the privacy protection, without compromising the ventilation.

Figure 10C:
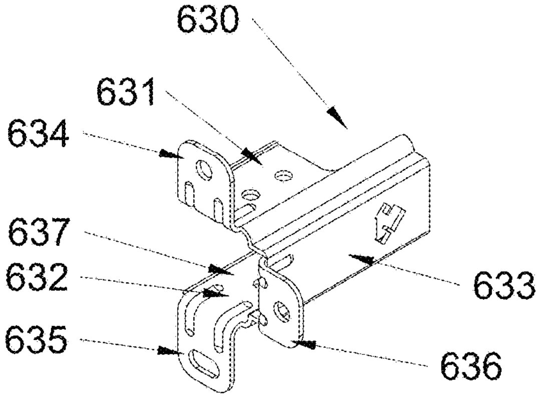

Referring to FIG. 1, FIG. 4 and FIG. 10C, the third side clip 630 includes third upper side clip arm 631, third lower side clip arm 632, third connecting arm 633, third upper side clip support arm 634, third lower side clip support arm 635, and third connecting support arm 636. The third upper side clip arm 631 and the third lower side clip arm 632 are opposite to each other, and respectively connected to two sides of the third connecting arm 633. The third upper side clip arm 631, the third lower side clip arm 632 and the third connecting arm 633 enclose third clip groove 637. The third clip groove 637 receives the first end 103 of the second support beam 120. The third upper side clip support arm 634 is formed by extending the third upper side clip arm 631 outward and bending the third upper side clip arm. The third lower side clip support arm 635 is formed by extending the third lower side clip arm 632 outward and bending the third lower side clip arm. The second connecting support arm 636 is formed by extending the third connecting arm 633 outward and bending the third connecting arm. The first end 103 of the second support beam 120 is connected to the first shutter carrier (not shown in the figure) through the third upper side clip support arm 634, the third lower side clip support arm 635 and the third connecting support arm 636. In actual use, the first shutter carrier may be the wall, the shutter post, the cabinet, the square tube, etc. The third connecting arm 633 is attached to the first side 121 of the second support beam 120, so as to abut against the first buckle bottom support 410 at the first end 103 of the second support beam 120, limit relative positions of the first buckle bottom support 410 and the second support beam 120, and make mounting positions of the first buckle bottom support 410 and the second buckle bottom support 420 staggered to each other on the second support beam 120. Consequently, the first shutter frame strips 310 and the second shutter frame strips 320 are staggered to each other. This makes the shutter frame strips at two sides realize the shading effect and the privacy protection, without compromising the ventilation.

Figure 10D:
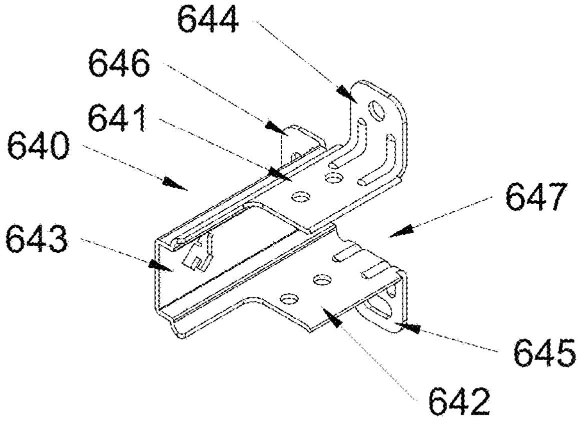

Referring to FIG. 1, FIG. 4 and FIG. 10D, the fourth side clip 640 includes fourth upper side clip arm 641, fourth lower side clip arm 642, fourth connecting arm 643, fourth upper side clip support arm 644, fourth lower side clip support arm 645, and fourth connecting support arm 646. The fourth upper side clip arm 641 and the fourth lower side clip arm 642 are opposite to each other, and respectively connected to two sides of the fourth connecting arm 643. The fourth upper side clip arm 641, the fourth lower side clip arm 642 and the fourth connecting arm 643 enclose fourth clip groove 647. The fourth clip groove 647 receives the second end 104 of the second support beam 120. The fourth upper side clip support arm 644 is formed by extending the fourth upper side clip arm 641 outward and bending the fourth upper side clip arm. The fourth lower side clip support arm 645 is formed by extending the fourth lower side clip arm 642 outward and bending the fourth lower side clip arm. The fourth connecting support arm 646 is formed by extending the fourth connecting arm 643 outward and bending the fourth connecting arm. The second end 104 of the second support beam 120 is connected to the second shutter carrier (not shown in the figure) through the fourth upper side clip support arm 644, the fourth lower side clip support arm 645 and the fourth connecting support arm 646. In actual use, the second shutter carrier may be the wall, the shutter post, the cabinet, the square tube, etc. The fourth connecting arm 643 is attached to the second side 122 of the second support beam 120, so as to abut against the second buckle bottom support 420 at the second end 104 of the second support beam 120, limit relative positions of the second buckle bottom support 420 and the second support beam 120, and make mounting positions of the first buckle bottom support 410 and the second buckle bottom support 420 staggered to each other on the second support beam 120. Consequently, the first shutter frame strips 310 and the second shutter frame strips 320 are staggered to each other. This makes the shutter frame strips at two sides realize the shading effect and the privacy protection, without compromising the ventilation.

Since the first shutter frame strips are detachably provided at the first side of the first support beam, and the second shutter frame strips are detachably provided at the second side of the first support beam, so the shutter assembly provided by the present disclosure is mounted and dismounted conveniently. The first shutter frame strips and the second shutter frame strips are staggered at two sides of the first support beam. A gap region between two adjacent first shutter frame strips is exactly obstructed by the corresponding second shutter frame strip. A gap region between two adjacent second shutter frame strips is exactly obstructed by the corresponding first shutter frame strip. Therefore, the present disclosure makes the shutter frame strips at two sides realize a shading effect and a privacy protection, without compromising ventilation.

Although descriptions and graphical representations on relevant embodiments of the present disclosure have been given, those skilled in the art should understand that the descriptions and graphical representations of the embodiments do not form limits to a scope of the present disclosure, and the present disclosure can be changed in various forms and details without departing from the concept and the scope of the present disclosure. Therefore, the scope of the present disclosure is not limited by the above embodiments, but depends on the claims and equivalents of the claims.

What is claimed is:

1. A shutter assembly, comprising:

at least two first shutter frame strips, at least two second shutter frame strips, at least two support beams, a first fixture and a second fixture, wherein the at least two first shutter frame strips are detachably provided at a first side of a first support beam of the at least two support beams; the at least two second shutter frame strips are detachably provided at a second side of the first support beam; and the at least two first shutter frame strips and the at least two second shutter frame strips are staggered in a length direction of the first support beam; wherein a gap region between two adjacent first shutter frame strips of the at least two first shutter frame strips is obstructed by a corresponding second shutter frame strip of the at least two second shutter frame strips; and a gap region between two adjacent second shutter frame strips of the at least two second shutter frame strips is obstructed by a corresponding first shutter frame strip of the at least two first shutter frame strips; wherein the first support beam comprises a first limit groove and a second limit groove; the first limit groove of the first support beam is formed in the first side of the first support beam and extends from a first end of the first support beam to a second end of the first support beam along the length direction of the first support beam; the second limit groove of the first support beam is formed in the second side of the first support beam and extends from the first end of the first support beam to the second end of the first support beam along the length direction of the first support beam; the first fixture is slidably provided in the first limit groove; and the second fixture is slidably provided in the second limit groove.

2. The shutter assembly according to claim 1, wherein the first limit groove of the first support beam comprises a first opening and a first inner cavity; the first opening and the first inner cavity of the first limit groove of the first support beam communicate with each other and extend from the first end of the first support beam to the second end of the first support beam along the length direction of the first support beam; a width of the first opening of the first limit groove of the first support beam is less than a width of the first inner cavity of the first limit groove of the first support beam; the second limit groove of the first support beam comprises a second opening and a second inner cavity; the second opening and the second inner cavity of the second limit groove of the first support beam communicate with each other and extend from the first end of the first support beam to the second end of the first support beam along the length direction of the first support beam; and a width of the second opening of the second limit groove of the first support beam is less than a width of the second inner cavity of the second limit groove of the first support beam.

3. The shutter assembly according to claim 2, wherein the first fixture comprises a first fixture base, a first fixture connecting portion, and at least two first clips; the at least two first clips are fixed on the first fixture base through the first fixture connecting portion; the first fixture base is slidable in the first inner cavity; the first fixture connecting portion is slidable in the first opening of the first limit groove of the first support beam; the at least two first clips are configured to clamp the at least two first shutter frame strips; each of the at least two first shutter frame strips comprises a first shutter displaying portion and at least two first shutter mounting portions; the at least two first shutter mounting portions are respectively detachably provided in the at least two first clips; the second fixture comprises a second fixture base, a second fixture connecting portion, and at least two second clips; the at least two second clips are fixed on the second fixture base through the second fixture connecting portion; the second fixture base is slidable in the second inner cavity; the second fixture connecting portion is slidable in the second opening of the second limit groove of the first support beam; the at least two second clips are configured to clamp the at least two second shutter frame strips; each of the at least two second shutter frame strips comprises a second shutter displaying portion and at least two second shutter mounting portions; and the at least two second shutter mounting portions are respectively detachably provided in the at least two second clips.

4. The shutter assembly according to claim 3, further comprising a first side clip and a second side clip, wherein the first side clip is configured to fixedly connect the first end of the first support beam to a first shutter carrier; the second side clip is configured to fixedly connect the second end of the first support beam to a second shutter carrier; the first side clip comprises a first upper side clip arm, a first lower side clip arm, and a first connecting arm; the first upper side clip arm and the first lower side clip arm are opposite to each other and respectively connected to two sides of the first connecting arm; the first upper side clip arm, the first lower side clip arm, and the first connecting arm enclose a first clip groove; the first clip groove receives the first end of the first support beam; the first connecting arm is attached to the first side of the first support beam; the second side clip comprises a second upper side clip arm, a second lower side clip arm, and a second connecting arm; the second upper side clip arm and the second lower side clip arm are opposite to each other and respectively connected to two sides of the second connecting arm; the second upper side clip arm, the second lower side clip arm, and the second connecting arm enclose a second clip groove; the second clip groove receives the second end of the first support beam; and the second connecting arm is attached to the second side of the first support beam.

5. The shutter assembly according to claim 4, further comprising a limit cap, wherein the limit cap covers upper ends of the at least two first shutter frame strips and upper ends of the at least two second shutter frame strips; the limit cap comprises a first covering portion, a second covering portion, and a connecting portion; the first covering portion and the second covering portion are staggered in parallel and connected through the connecting portion; the first covering portion covers the upper ends of the at least two first shutter frame strips; the second covering portion covers the upper ends of the at least two second shutter frame strips; the first support beam further comprises a third side and a fourth side; the third side and the fourth side are opposite to each other, and the first side, the third side, the second side, and the fourth side are sequentially connected to enclose an overall outer side of the first support beam; and the connecting portion of the limit cap covers the third side of the first support beam, and a plurality of through holes are formed in the connecting portion.

6. The shutter assembly according to claim 5, wherein the at least two support beams further comprises a second support beam, the second support beam is parallel to the first support beam; the second support beam is located below the first support beam; the second support beam also comprises a first side and a second side opposite to each other; the at least two first shutter frame strips are detachably provided at the first side of the second support beam; and the at least two second shutter frame strips are detachably provided at the second side of the second support beam.

7. The shutter assembly according to claim 6, further comprising a third side clip and a fourth side clip, wherein the third side clip is configured to fixedly connect the first end of the second support beam to a first shutter carrier; the fourth side clip is configured to fixedly connect the second end of the second support beam to a second shutter carrier; the third side clip comprises a third upper side clip arm, a third lower side clip arm, a third connecting arm; the third upper side clip arm and the third lower side clip arm are opposite to each other and respectively connected to two sides of the third connecting arm; the third upper side clip arm, the third lower side clip arm, and the third connecting arm enclose a third clip groove; the third clip groove receives the first end of the second support beam; the third connecting arm is attached to the first side of the second support beam; the fourth side clip comprises a fourth upper side clip arm, a fourth lower side clip arm, and a fourth connecting arm; the fourth upper side clip arm and the fourth lower side clip arm are opposite to each other and respectively connected to two sides of the fourth connecting arm; the fourth upper side clip arm, the fourth lower side clip arm, and the fourth connecting arm enclose a fourth clip groove; the fourth clip groove receives the second end of the second support beam; and the fourth connecting arm is attached to the second side of the second support beam.

8. The shutter assembly according to claim 6, wherein the second support beam further comprises a third side and a fourth side opposite to each other, and the first side, the third side, the second side, and the fourth side of the second support beam are sequentially connected to enclose an overall outer side of the second support beam; the shutter assembly further comprises a first buckle bottom support and a second buckle bottom support; the second support beam comprises a first limit groove and a second limit groove; the first limit groove of the second support beam is formed in the first side of the second support beam and extends from a first end of the second support beam to a second end of the second support beam along a length direction of the second support beam; the second limit groove of the second support beam is formed in the second side of the second support beam and extends from the first end of the second support beam to the second end of the second support beam along the length direction of the second support beam; the first buckle bottom support is slidably provided in the first limit groove of the second support beam; and the second buckle bottom support is slidably provided in the second limit groove of the second support beam.

9. The shutter assembly according to claim 8, wherein the first limit groove of the second support beam comprises a first opening and a first inner cavity; the first opening and the first inner cavity of the second support beam communicate with each other and extend from the first end of the second support beam to the second end of the second support beam along the length direction of the second support beam; a width of the first opening of the first limit groove of the second support beam is less than a width of the first inner cavity of the first limit groove of the second support beam; the second limit groove of the second support beam comprises a second opening and a second inner cavity; the second opening and the second inner cavity of the second limit groove of the second support beam communicate with each other and extend from the first end of the second support beam to the second end of the second support beam along the length direction of the second support beam; a width of the second opening of the second limit groove of the second support beam is less than a width of the second inner cavity of the second limit groove of the second support beam; the first buckle bottom support comprises a first buckle base, a first buckle connecting portion, at least two first buckle clips, and a first bottom support member; the at least two first buckle clips are fixed on the first buckle base through the first buckle connecting portion; the first bottom support member is fixedly connected to the first buckle connecting portion and the at least two first buckle clips; the first buckle base is slidable in the first inner cavity of the first limit groove of the second support beam; the first buckle connecting portion is slidable in the first opening of the first limit groove of the second support beam; the at least two first buckle clips are configured to clamp the at least two first shutter frame strips; the at least two first shutter mounting portions are respectively detachably provided in the at least two first buckle clips; the first bottom support member is sleeved on lower ends of the at least two first shutter frame strips; the second buckle bottom support comprises a second buckle base, a second buckle connecting portion, at least two second buckle clips, and a second bottom support member; the at least two second buckle clips are fixed on the second buckle base through the second buckle connecting portion; the second bottom support member is fixedly connected to the second buckle connecting portion and the at least two second buckle clips; the second buckle base is slidable in the second inner cavity of the second limit groove of the second support beam; the second buckle connecting portion is slidable in the second opening of the second limit groove of the second support beam; the at least two second buckle clips are configured to clamp the at least two second shutter frame strips; the at least two second shutter mounting portions are respectively detachably provided in the at least two second buckle clips; and the second bottom support member is sleeved on lower ends of the at least two second shutter frame strips.

* * * * *